S. STEGALL.
PLOW.
APPLICATION FILED JUNE 6, 1914.
1,119,199.
Patented Dec. 1, 1914.
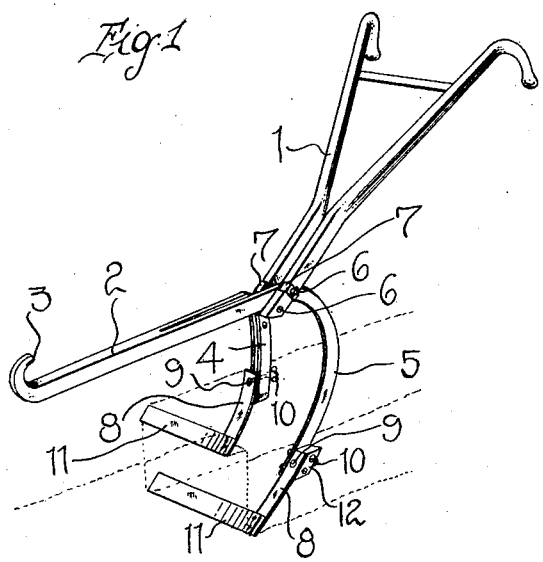
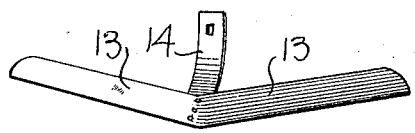
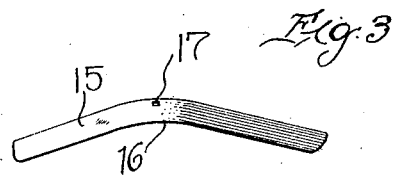
Inventor
SIDNEY STEGALL
Witnesses

UNITED STATES PATENT OFFICE.

SIDNEY STEGALL, OF PELZER, SOUTH CAROLINA.

PLOW.

1,119,199.  Specification of Letters Patent.  Patented Dec. 1, 1914.

Application filed June 6, 1914. Serial No. 843,496.

*To all whom it may concern:*

Be it known that I, SIDNEY STEGALL, a citizen of the United States, residing at Pelzer, in the county of Anderson and State of South Carolina, have invented certain new and useful Improvements in Plows, of which the following is a specification, reference being had to the accompanying drawings.

This invention relates to new and useful improvements in plows and more particularly to a plow which is used in the form of a cultivator for breaking the ground and cutting the weeds between the rows of growing plants, the main object of the present invention being the provision of a device of the above character which is preferably used for cultivating cotton and is to be used for working the crop and breaking up the soil, without cutting the roots of the plants and also for breaking up the crust which forms upon the ground after a hard rain.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application, Figure 1 is a perspective view of a plow constructed in accordance with my invention. Fig. 2 is a detail perspective view of one of the plow blades, illustrating a modified form thereof; Fig. 3 is a detail perspective view illustrating another modified form of plow blade.

In carrying out my invention, I provide a supporting plow frame, which is in the form of two divergent handle members 1, the inner ends of which converge inwardly and are bolted to opposite sides of the plow beam 2. The plow beam 2 consists of two parallel members which are merged together at their forward ends and are bent upon themselves to form a clevis hook 3. One of the members composing the plow beam is bent upon itself to form a standard 4, the end of the same extending upwardly again and arranged upon one side of the other of said members. The second member of the plow beam extends rearwardly and is curved downwardly, as shown at 5 to form a second standard, arranged directly in the rear and in spaced relation with the standard 4.

It will be apparent that the lower end of the member 5 extends downwardly below the end of the standard 4 and is arranged in a plane beneath the same. The plow beam is securely held against movement by having the bolts 6 extending therethrough and through the handle members 1. Metal clips 7 are arranged in spaced relation upon the outer sides of the handle members 1 and the ends thereof are adapted to engage over the side edges of the handle members and are held in position by the bolts 6. It is preferable to use these clips on the handle members to prevent the same from splitting or slivering.

In Fig. 1, I have illustrated the form of plow member which is to be used in working the soil and includes the foot 8 which is provided with a suitable bolt opening, whereby the same may be readily bolted to the standards 4 or 5, the bolt 9 extending between the spaced members forming the standard 4 and a wing nut 10 is threaded upon the inner end thereof to securely retain the foot 8 in position. Secured to the foot at its outer end, is a cutting blade 11 which extends at right angles to the foot 8 and in view of the fact that the standards 4 and 5 are arranged in spaced relation and the standard 5 disposed directly in the rear of the standard 4, these cutting blades 11 will be arranged in substantially the same position, the advance cutting blade breaking up the top of the soil, while the rear cutting blade will cut down through the soil, to a desired level. In order to secure one of the feet 8 to the standard 5, a wooden block 12 is bolted to one side of the standard and is provided with an opening adjacent the end of the standard for the reception of the securing bolt.

In Fig. 2, I have illustrated still another modified form of the invention, which includes substantially T-shaped plow members which are preferably used for cutting and breaking the soil between the rows of the plants. These plows include the blade members 13 which are bolted or otherwise secured at their central portions to the attaching bracket 14. The outer end of said bracket is provided with a suitable opening, whereby they may be readily attached to the front ends of the standards 4 and 5, by means of bolts or other similar fastening means. These plow blades 13 may be of any desired length, according to the distance between the rows which are to be cultivated. In going through the rows, these blades will cut the roots of weeds which spring up between the rows of the plants, thus destroying the same. It will be readily apparent that this form of cutting blade may be quickly and readily secured to the standards 4 and 5 or removed therefrom.

In Fig. 3 I have illustrated still another modified form of plow member which is in the form of a substantially longitudinal cutting blade 15, the central portion of which is somewhat arcuate in form, as shown at 16 and is provided with a central opening 17 adapted to receive the securing bolts when the same are to be applied to the lower ends of the standards 4 and 5. It will be understood that this form of cutting blade is to be used for breaking the crust which generally occurs after a hard rain, wherein the top of the ground is packed down solid. This form of cutting blade will break up the crust upon the top of the soil and afford a thorough circulation of the moisture in the soil. It will be apparent from the foregoing that this device is preferably attached directly to the lower ends of the standards 4 and 5, without the use of any foot or other similar device for securing the same.

From the above description taken in connection with the accompanying drawings, it will be readily apparent that I have provided a simple and durable plow or cultivator which can be used for cultivating between the rows of growing plants and break up and loosen the soil for circulating moisture therein. It will also be apparent that several different forms of plows or cultivator feet may be used in connection with my improved device. These different forms of cutting plows can be quickly and readily applied to the device or removed therefrom and, at the same time it will be noted that the whole device is extremely simple in its construction and can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claims.

Having thus described this invention, what I claim is:—

1. A device of the class described including a plow beam bifurcated at its rear end, the free extremities of the forks being bent downwardly to provide spaced standards of different lengths, the shorter of said standards being bent upon itself to afford a guideway, a ground engaging implement adjustably connected within said guideway and a second ground engaging implement secured to the second standard.

2. A device of the class described including a plow beam bifurcated at its rear end, the free extremities of the forks being bent downwardly to provide spaced standards of different lengths, the longer of said standards having a block secured to the lower extremity thereof and a ground engaging implement secured to said block, and a second ground engaging implement secured to the second standard.

In testimony whereof I hereunto affix my signature in the presence of two witnesses.

SIDNEY $\underset{\text{mark}}{\overset{\text{his}}{\times}}$ STEGALL.

Witnesses:
T. P. HINDMAN,
M. C. COLEMAN.

Copies of this patent may be obtained for five cents each, by addressing the "Commissioner of Patents. Washington, D. C."